United States Patent
Jang et al.

(10) Patent No.: US 8,873,413 B2
(45) Date of Patent: Oct. 28, 2014

(54) METHOD AND DEVICE FOR MEASURING SIGNAL IN WIRELESS COMMUNICATION SYSTEM

(75) Inventors: Jaehyuk Jang, Suwon-si (KR); Soenghun Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 162 days.

(21) Appl. No.: 13/400,853

(22) Filed: Feb. 21, 2012

(65) Prior Publication Data

US 2012/0213107 A1 Aug. 23, 2012

Related U.S. Application Data

(60) Provisional application No. 61/444,844, filed on Feb. 21, 2011.

(51) Int. Cl.
*H04L 1/00* (2006.01)
*H04L 12/26* (2006.01)
(Continued)

(52) U.S. Cl.
CPC ............ *H04W 24/10* (2013.01); *H04W 52/367* (2013.01); *H04W 72/087* (2013.01);
(Continued)

(58) Field of Classification Search
CPC . H04W 24/10; H04W 72/082; H04W 72/085; H04W 72/087; H04W 16/14; H04W 24/02; H04W 72/1231; H04W 72/1236; H04W 24/00; H04W 72/08; H04W 72/1226; H04W 72/04

USPC .......................................................... 370/252
See application file for complete search history.

(56) References Cited

U.S. PATENT DOCUMENTS

2007/0117522 A1 5/2007 Axness et al.
2010/0331029 A1 12/2010 Linsky et al.
(Continued)

FOREIGN PATENT DOCUMENTS

WO WO 2012 115429 A2 * 8/2012 ............ H04W 24/00

OTHER PUBLICATIONS

Written Opinion for PCT/KR2012/001303, "PCT Written Opinion of the Intenrational Search Authority", Sep. 27, 2012, ISA/KR, all pages.*

(Continued)

*Primary Examiner* — Kwang B Yao
*Assistant Examiner* — Adam Duda
(74) *Attorney, Agent, or Firm* — Jefferson IP Law, LLP

(57) ABSTRACT

A signal measurement method and a device for comparing measurement results of a serving cell and a neighbor cell in a wireless communication system are provided. The method includes receiving a resource restriction pattern including first pattern information that indicates specific subframes to be restricted in measurement of the serving cell, measuring the neighbor cell at a first frequency band, measuring, if a predetermined condition is met, the serving cell applying the first pattern information, and measuring, if the predetermined condition is not met, the serving cell without applying the first pattern information and performing evaluation by comparing a serving cell measurement result obtained from measurement of the serving cell with a neighbor cell measurement result obtained from measurement of the neighbor cell.

14 Claims, 6 Drawing Sheets

(51) Int. Cl.
*H04W 52/36* (2009.01)
*H04W 72/08* (2009.01)
*H04L 5/14* (2006.01)
*H04L 5/00* (2006.01)
*H04W 52/14* (2009.01)
*H04W 52/34* (2009.01)
*H04W 52/28* (2009.01)
*H04W 52/22* (2009.01)
*H04W 24/10* (2009.01)
*H04W 28/04* (2009.01)
*H04W 72/00* (2009.01)
*H04W 72/12* (2009.01)

(52) U.S. Cl.
CPC ............ *Y02B 60/50* (2013.01); *H04W 28/048* (2013.01); *H04L 5/1469* (2013.01); *H04W 72/00* (2013.01); *H04L 5/0098* (2013.01); *H04W 52/146* (2013.01); *H04W 52/346* (2013.01); *H04W 52/286* (2013.01); *H04L 5/0057* (2013.01); *H04L 5/0078* (2013.01); *H04W 72/085* (2013.01); *H04W 72/1236* (2013.01); *H04L 5/001* (2013.01); *H04W 52/228* (2013.01); *H04W 72/1231* (2013.01)
USPC ......................................................... 370/252

(56) References Cited

U.S. PATENT DOCUMENTS

| | | |
|---|---|---|
| 2011/0026458 A1 | 2/2011 | Gruber et al. |
| 2011/0275394 A1* | 11/2011 | Song et al. .................... 455/509 |
| 2012/0046030 A1* | 2/2012 | Siomina et al. ............... 455/423 |
| 2012/0275322 A1* | 11/2012 | Ji et al. .......................... 370/252 |
| 2013/0058234 A1* | 3/2013 | Yang et al. .................... 370/252 |
| 2013/0079049 A1* | 3/2013 | Yu et al. ........................ 455/524 |
| 2013/0084910 A1* | 4/2013 | Suzuki et al. ................. 455/515 |
| 2013/0107826 A1* | 5/2013 | Dinan ............................ 370/329 |
| 2013/0128765 A1* | 5/2013 | Yang et al. .................... 370/252 |
| 2013/0201848 A1* | 8/2013 | Kazmi et al. ................. 370/252 |
| 2013/0215785 A1* | 8/2013 | Jung et al. ..................... 370/252 |
| 2013/0235738 A1* | 9/2013 | Siomina et al. ............... 370/252 |
| 2013/0301451 A1* | 11/2013 | Siomina et al. ............... 370/252 |

OTHER PUBLICATIONS

International Search Report for PCT/KR2012/001303, "PCT International Search Report", Feb. 21, 2011, ISA/KR, all pages.*
ETSI TS 136 331 V10.1.0, "LTE; Evolved Universal Terrestrial Radio Acces (E-UTRA); Radio Resource Control (RRC); Protocol Specification", 3GPP, Apr. 2011, all pages.*
ETSI TS 136 331 V8.14.0, "LTE; Evolved Universal Terrestrial Radio Acces (E-UTRA); Radio Resource Control (RRC); Protocol Specification", 3GPP, Jul. 2011, all pages.*

* cited by examiner

METHOD AND DEVICE FOR MEASURING SIGNAL IN WIRELESS COMMUNICATION SYSTEM

PRIORITY

This application claims the benefit under 35 U.S.C. §119 (e) of a U.S. Provisional application filed on Feb. 21, 2011 in the U.S. Patent and Trademark Office and assigned Ser. No. 61/444,844, the entire disclosure of which is hereby incorporated by reference.

BACKGROUND OF THE INVENTION

1. Field of the Invention

The present invention relates to a wireless communication system. More particularly, the present invention relates to a method for measuring interference in order to avoid interference and for measuring signal strength of neighbor base stations when different types of wireless communication modules coexist in a device.

2. Description of the Related Art

In recent years, the rapid propagation of smart phones has caused the increase of demands for data. Accordingly, the amount of data transmission has rapidly increased.

In order to satisfy the increased demands for data, wireless communication systems have been configured to distribute loads to pico base stations or femto base stations in addition to existing macro base stations that are responsible for wide coverage. As a result, a space between base stations becomes narrower. Moreover, as the distance between base station decreases, coverage overlap among base stations becomes serious. In such an environment, a method for more favorably measuring and reporting signals among cells is required.

Additionally, with smart phones being popularized, the demand and use for functionality associated with Wireless Local Area Network (WLAN) connectivity, Bluetooth connectivity, and Global Positioning System (GPS) connectivity embedded in the smart phone have also increased. This trend gives rise to coexistence of several communication technologies (e.g., cellular network technology such as Long Term Evolution (LTE) or Universal Mobile Telecommunication System (UMTS), WLAN, Bluetooth, Global Navigation Satellite System (GNSS) or GPS) in a single device. When these different communication technologies are used at the same time, interference may occur among the various technologies. The issue of interference among the various technologies is being discussed under the name of In-Device Coexistence (IDC) in the $3^{rd}$ Generation Partnership Project (3GPP).

Meanwhile, LTE/UMTS communication technology uses various frequency bands, whereas others such as Bluetooth or WLAN use the Industrial, Scientific and Medical (ISM) frequency band of 4400-2483.5 MHz. Particularly, among the various frequency bands used by LTE/UMTS, Band 4 (e.g., 4300-2400 MHz) and uplink of Band 7 (e.g., 4500-2570 MHz) are adjacent to the ISM frequency band used by Bluetooth or WLAN. Consequently, if the various technologies simultaneously use adjacent frequency bands for communication, a transmitting signal in one communication technology may often become a reception signal in others. Unfortunately, such reception of a signal transmitted by another communication technology that uses an adjacent frequency band invites serious interference issues.

Therefore, a need exists for accurate measurement for monitoring a mutual effect of interference that occurs among neighbor base stations or in a device.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and device for measuring interference when different types of communication modules coexist in a device.

Another aspect of the present invention is to provide a method for measuring signals of neighbor base stations without distortion under circumstances in which macro base stations and pico/femto base stations coexist.

According to an aspect of the present invention, a method for comparing measurement results of a serving cell and neighbor cells is provided. The method includes receiving a resource restriction pattern including first pattern information that indicates specific subframes to be restricted in measurement of the serving cell, measuring the neighbor cell at a first frequency band, measuring, if a predetermined condition is met, the serving cell applying the first pattern information, and measuring, if the predetermined condition is not met, the serving cell without applying the first pattern information, and performing evaluation by comparing a serving cell measurement result obtained from measurement of the serving cell with a neighbor cell measurement result obtained from measurement of the neighbor cell.

According to another aspect of the present invention, a device for comparing measurement results of a serving cell and neighbor cells is provided. The device includes a transceiver configured to receive a resource restriction pattern including first pattern information that indicates specific subframes to be restricted in measurement of the serving cell, and a control unit configured to measure the neighbor cell at a first frequency band, to measure, if a predetermined condition is met, the serving cell applying the first pattern information, to measure, if the predetermined condition is not met, the serving cell without applying the first pattern information and to perform evaluation by comparing a serving cell measurement result obtained from measurement of the serving cell with a neighbor cell measurement result obtained from measurement of the neighbor cell.

According to another aspect of the present invention, a method for monitoring interference signals is provided. The method includes determining whether in-device interference occurs or whether in-device interference is expected to occur, monitoring a Quality of Service (QoS) if it is determined that in-device interference occurs or if it is determined that in-device interference is expected to occur, comparing the monitored QoS with a first predetermined threshold, and measuring signal strength and interference according to one of a first measurement method and a second measurement method, such that the signal strength and interference is measured according to the first measurement method if the monitored QoS is greater than or equal to the first predetermined threshold, and the signal strength and interference is measured according to the second measurement method if the monitored QoS is less than the first predetermined threshold.

Aspects of the present invention may favorably measure the effects of interference in a device or among neighbor cells, thus allowing smooth communication.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although a Long Term Evolution (LTE) system is exemplarily used herein for describing an exemplary embodiment of the present invention, any other cellular communication systems may also be applied to the present invention. Hereinafter, any communication technology (e.g., Wireless Local Area Network (WLAN), Bluetooth, Global Positioning System (GPS), etc.) that causes interference, except LTE, will be referred to as interfering communication technology. Additionally, a user terminal or device available for LTE will be referred to as User Equipment (UE), and a base station available for LTE will be referred to as an evolved Node B (eNB).

Figure 1:
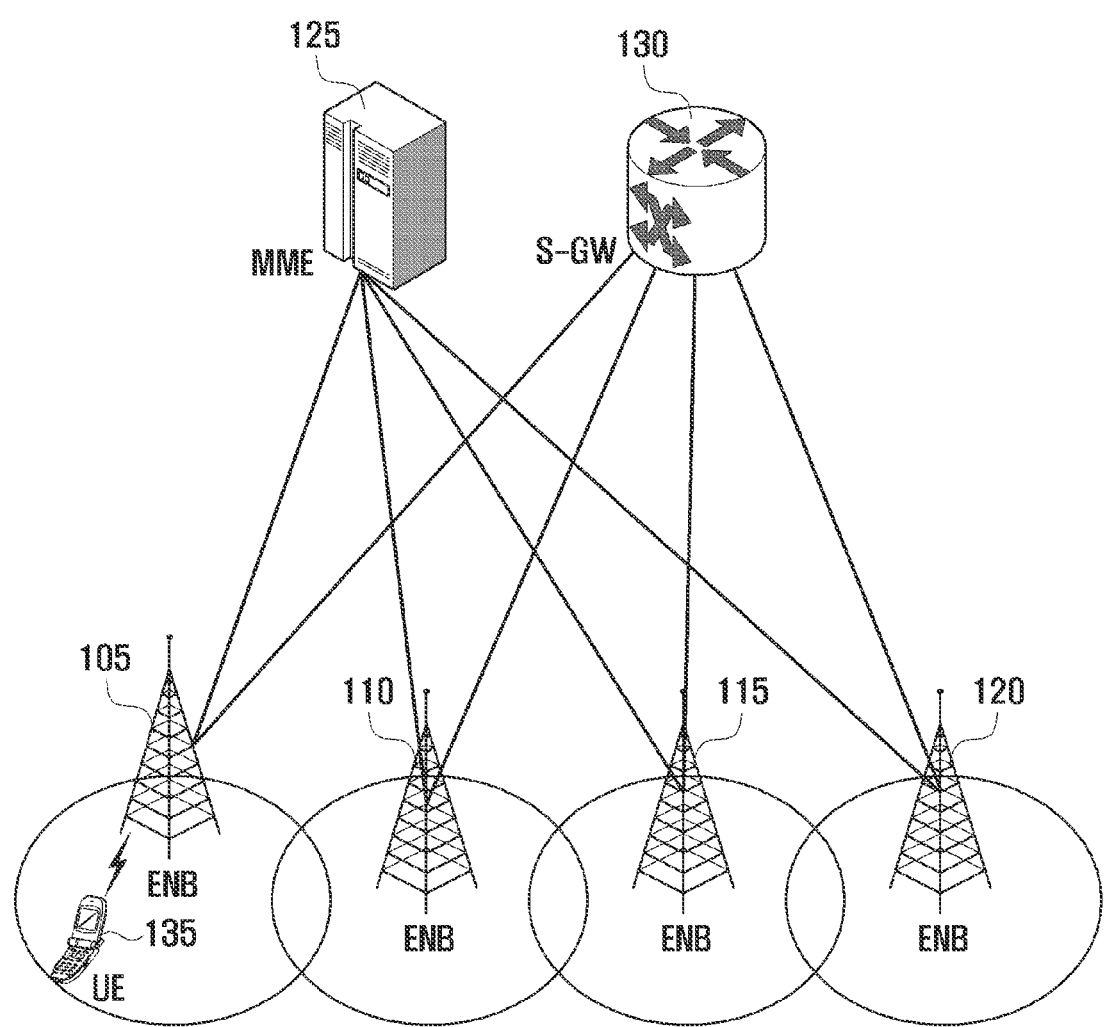
FIG. 1 is a schematic view illustrating a Long Term Evolution (LTE) system in accordance with an exemplary embodiment of the present invention.

FIG. 1 is a schematic view illustrating an LTE system in accordance with an exemplary embodiment of the present invention.

Referring to FIG. 1, a wireless access network of the LTE system is composed of eNBs 105, 110, 115 and 120, a Mobility Management Entity (MME) 125, and a Serving-Gateway (S-GW) 130. UE 135 may access external networks through the eNBs 105-120 and the S-GW 130.

As an example, the eNB 105-120 corresponds to the existing node B of a Universal Mobile Telecommunication System (UMTS) system. The eNB is connected to the UE 135 via a wireless channel and performs more complicated tasks than the existing node B does. In the LTE system, all user traffic including a real-time service such as Voice over Internet Protocol (VoIP) is offered through a shared channel. Therefore, some apparatus that performs scheduling by collecting state information (such as, for example, a UE buffer state, an available transmit power state, a channel state, etc.) is required. According to exemplary embodiments of the present invention, this task of scheduling by collecting state information is assigned to the eNB 105-120. As an example, a single eNB typically controls a plurality of cells.

For example, in order to realize a transmission rate of 100 Mbps, the LTE system uses Orthogonal Frequency Division Multiplexing (OFDM) as wireless access technique in a 20 MHz bandwidth. Additionally, an Adaptive Modulation & Coding (AMC) technique that determines the modulation scheme and the channel coding rate according to a channel state of UE is used. The S-GW 130 is a device that provides data bearers. For example, the S-GW 130 creates or removes a data bearer under the control of the MME 125. The MME 125 is a device capable of performing various control functions, including, the mobility management of a UE. The MME 126 may be connected to a plurality of eNBs.

Figure 2:
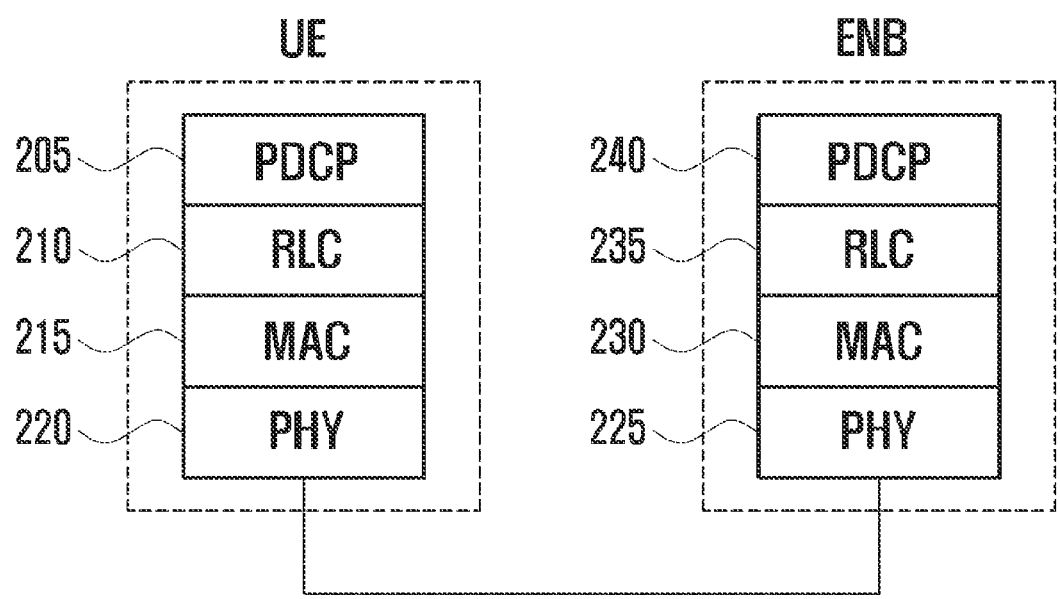
FIG. 2 is a view illustrating a wireless protocol structure in an LTE system in accordance with an exemplary embodiment of the present invention.

FIG. 2 is a view illustrating a wireless protocol structure in an LTE system in accordance with an exemplary embodiment of the present invention.

Referring to FIG. 2, according to exemplary embodiments, a UE and an eNB communicating using the wireless protocol of LTE system respectively include Packet Data Convergence Protocol (PDCP) layer 205 or 240, Radio Link Control (RLC) layer 210 or 235, Medium Access Control (MACS) layer 215 and 230, and a Physical (PHY) layer 220 or 225. The PDCP layer 205 and 240 performs compression and decompression of Internet Protocol (IP) headers. The RLC layer 210 and 235 reconfigures PDCP Packet Data Unit (PDU) to an appropriate size and performs Automatic Repeat reQuest (ARQ) operation or the like. The MAC layer 215 and 230 is connected to several layer devices configured in single UE, performs the multiplexing of RLC PDU into MAC PDU, and/or performs the demultiplexing of RLC PDU from MAC PDU. A physical layer 220 and 225 creates OFDM symbols by channel-coding and modulating data of upper layers and transmits the OFDM symbols to a wireless channel, or demodulates and channel-decodes OFDM symbols received through a wireless channel and transmits the data to upper layers.

If different types of modules coexist in the UE, a method for measurement and reporting according to the related art may not be a good solution for issues relating to interference. Interference is caused intermittently by different modules, and problems such as a failure in data transmission may occur during interference. However, because a method of measurement according to the related art equalizes such interference for a long time, the effects of interference may not be properly reflected. Normally, each of the services that a user uses has requirements associated with Quality of Service (QoS), including Block Error Rate (BLER) that indicates the probability of transmission failure of packet. In other words, each of the services that a user uses has a QoS associated with indications as to how much data is successfully transmitted.

Figure 3:
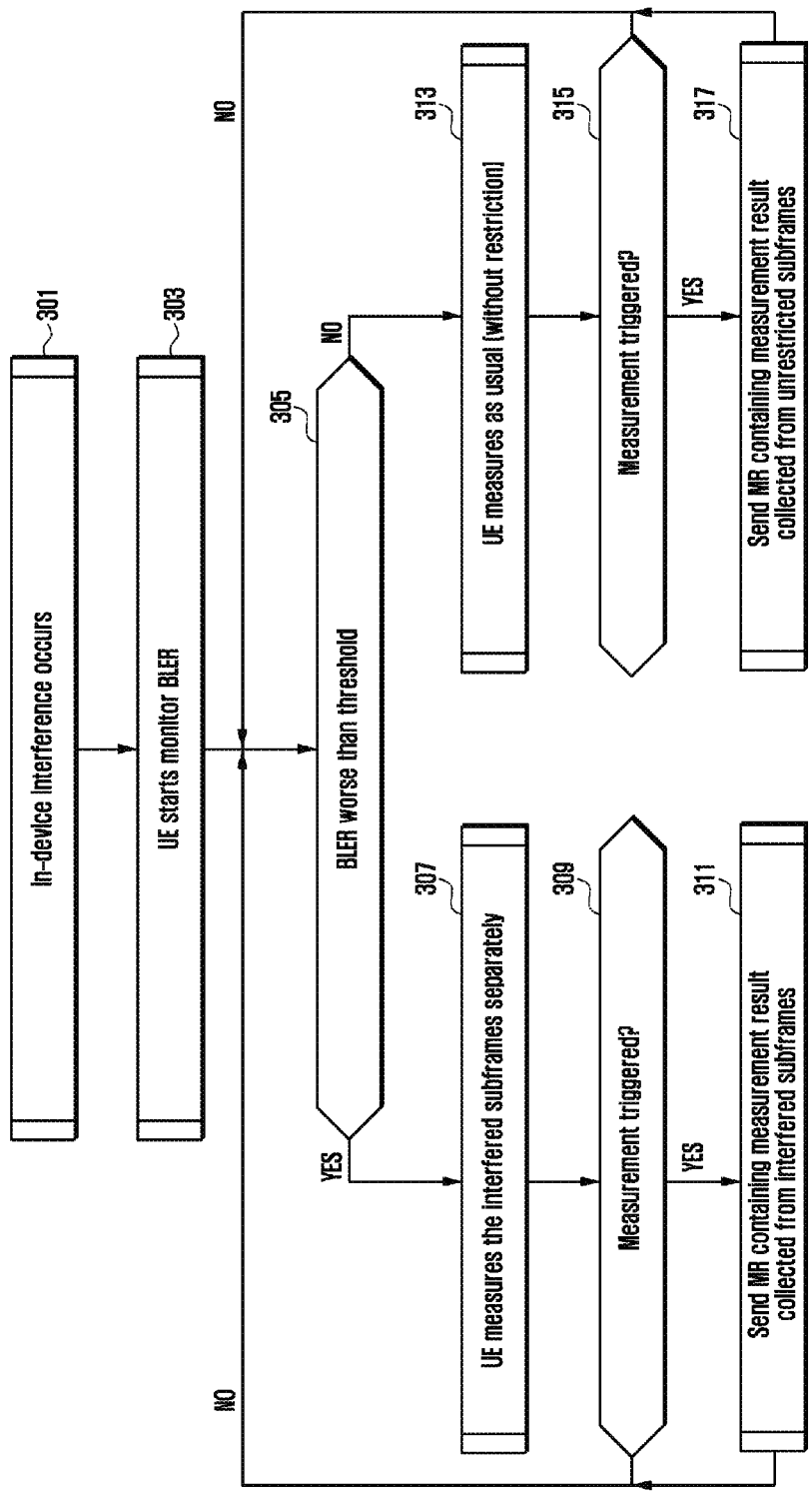
FIG. 3 is a flow diagram illustrating a method for measuring interference signals in accordance with an exemplary embodiment of the present invention.

FIG. 3 is a flow diagram illustrating a method for measuring interference signals in accordance with an exemplary embodiment of the present invention.

According to exemplary embodiments of the present invention, at step 301, in-device interference occurs (namely, when different types of modules in the UE begin transmission at any frequency adjacent to a serving frequency used in an LTE system) or in-device interference is expected to occur. If in-device interference occurs or if in-device interference is expected to occur at step 301, then the procedure proceeds to step 303. At step 303, the UE starts monitoring BLER or a failure rate of a Physical Downlink Control Channel (PDCCH).

The UE determines whether the BLER is worse than a given or predefined threshold, or whether the BLER is worse than another threshold that is received from the eNB through a message used in the Radio Resource Control (RRC) layer at step 305. As an example, if a service is normal VoIP, a threshold may be 10-2.

If the BLER is worse than a threshold, then the UE measures the interfered subframes separately at step 307. For example, the UE measures the signal strength of the interfered subframes and equalizes the measurement results according to filtering coefficient.

Then the UE compares the equalized measurement result with a specific threshold at step 309. The eNB may provide such specific threshold to the UE through measurement configuration information. If the measurement result is worse than the specific threshold, then the UE sends a Measurement Report (MR) message of the RRC layer to the eNB at step 311. The MR may include the measurement result collected from interfered subframes. Depending on the MR message, the eNB may perform a handover of the UE to another frequency. The MR message may further include the measurement result of another predetermined frequency, another frequency that is indicated in system information, and/or the measurement result of other Radio Access Technologies (RAT). If the measurement result is better than the specific threshold in the step 309, then the process returns to the step 305.

If BLER is better than a threshold, or if there is no in-device interference, then the UE performs a usual measurement method at step 313. For example, without restricting subframes, the UE measures and equalizes the signal strength and interference. Then the UE compares the equalized measurement result with a specific threshold at step 315. The eNB may provide such specific threshold to the UE through measurement configuration information. If the equalized signal strength is worse than the specific threshold, then the UE sends an MR message of the RRC layer, including the measurement result collected from unrestricted subframes, to the eNB at step 317.

The UE may determine the degree of seriousness of in-device interference from BLER and, if serious, the UE may report it to the eNB so as to request an appropriate action. For instance, the UE recognizes BLER received from the eNB or defined in a standard, and then starts measuring BLER of the LTE system from an expected time of in-device interference. Thereafter, if BLER becomes worse than a given threshold, the UE creates a required RRC control message, and the UE sends the RRC control message to the eNB. As an example, because a voice service is very sensitive to QoS deterioration and normally requires a BLER of 10e-2, the BLER may be fixed to 10e-2.

The RRC control message may include the following information: types and properties of different modules, a measured value of BLER that begins to be measured after activation of different modules; auxiliary information; an interfered frequency; an unserviceable frequency; and a preferred pattern (e.g., offset, period, bitmap, etc.) for avoiding interference in time when it is not possible to move to other frequency.

When receiving the control message, the eNB determines the seriousness of in-device interference with reference to a measured value of BLER and takes necessary action. For example, if the eNB may perform a handover to other frequency band.

Figure 4:
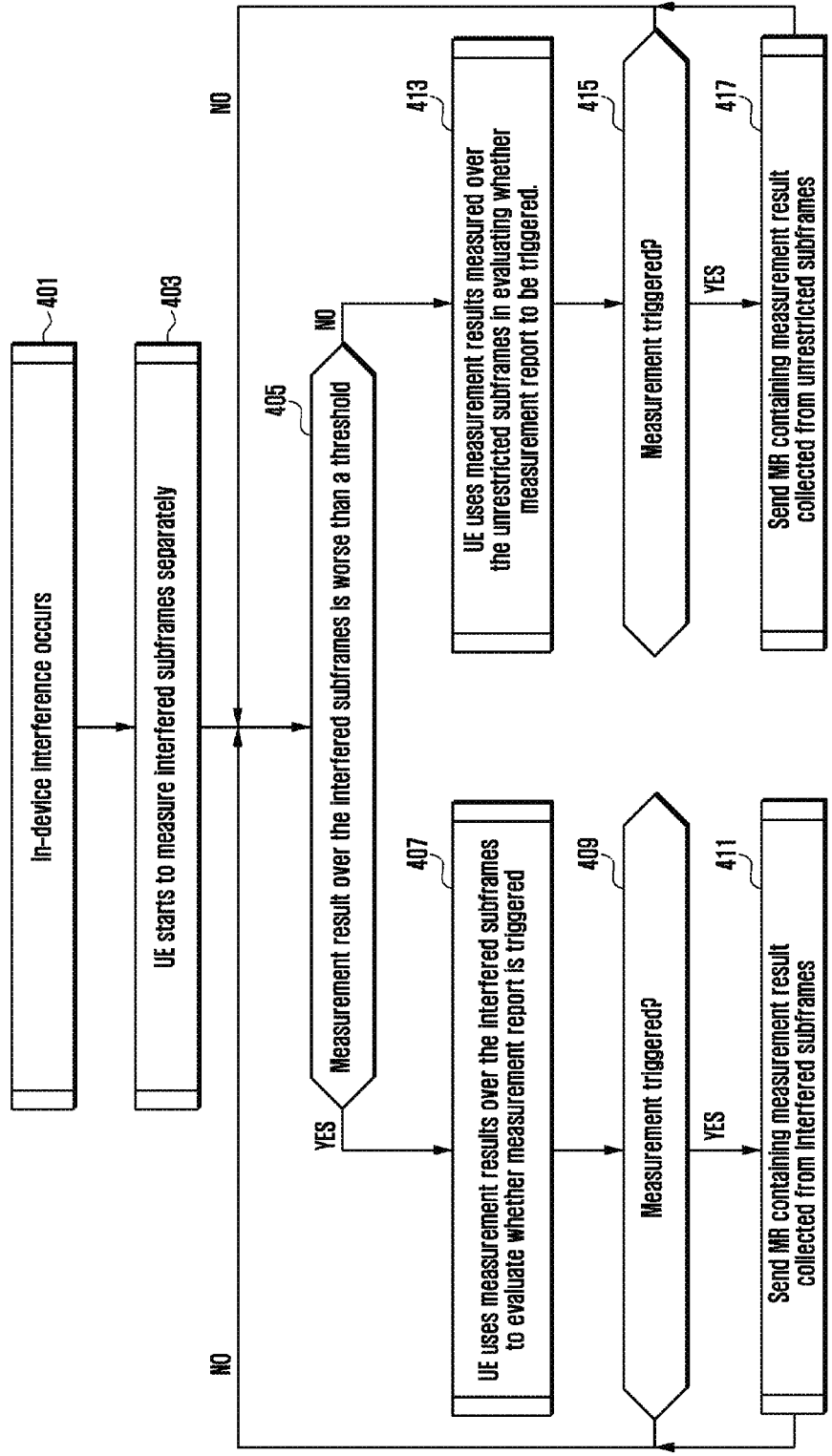
FIG. 4 is a flow diagram illustrating a method for measuring interference signals in accordance with another exemplary embodiment of the present invention.

FIG. 4 is a flow diagram illustrating a method for measuring interference signals in accordance with another exemplary embodiment of the present invention.

According to an exemplary embodiment of the present invention, when in-device interference occurs, the UE measures a Cell Reference Signal (CRS). According to a Reference Signal Received Power (RRSP) or a Reference Signal Received Quality (RSRQ) the UE determines whether interference occurs or not. As an example, the RRSP and/or RSRQ corresponds to the BLER described with reference to FIG. 3.

According to an exemplary embodiment of the present invention, at step 401, in-device interference occurs or is expected to occur. For example, in-device interference may occur or may be expected to occur when different types of modules in the UE begin transmission at any frequency adjacent to a serving frequency used in LTE, or at any frequency band adjacent to or nearly adjacent to a serving frequency used in the LTE. If in-device interference occurs or is expected to occur, then the UE starts to measure interfered subframes separately at step 403. As an example, the UE measures interfered subframes only and equalizes the measurement results by means of filtering coefficient.

Then the UE compares the equalized measurement result with a specific threshold at step 405. This specific threshold is an RSRP or an RSRQ. As an example, the RSRP and the RSRQ may correspond to the BLER described above with reference to FIG. 3. The RSRP and/or the RSRQ may be predetermined in the standard or may be received from the eNB through a message of the RRC layer.

If the measurement result of interfered subframes is worse than the specific threshold, the UE uses the measurement result of the interfered subframes so as to evaluate whether a measurement report will be triggered at step 407. Then the UE compares the equalized measurement result with a specific threshold at step 409. As an example, the eNB may provide such specific threshold to the UE through measurement configuration information. If the measurement result is worse than the specific threshold, the UE sends an MR message of the RRC layer, including the measurement result collected from interfered subframes, to the eNB at step 411. Depending on the MR message, the eNB may perform a handover of the UE to another frequency. The MR message may further include the measurement result of another frequency predetermined or indicated in system information, and/or the measurement result of other RAT.

If the measurement result of interfered subframes is not worse than the specific threshold, the UE uses the measurement results of all subframes without any restriction so as to evaluate whether to trigger a measurement report at step 413. Then the UE compares the equalized measurement result with a specific threshold at step 415. The eNB may provide such specific threshold to the UE through measurement configuration information. If the equalized signal strength is worse than the specific threshold, the UE sends an MR message of the RRC layer, including the measurement result collected from unrestricted subframes, to the eNB at step 417.

According to exemplary embodiments of the present invention, even if there are no different modules in the UE which may cause interference, it may be required to measure signals received from neighbor cells under circumstances in which macro base stations and pico/femto base stations coexist. In other words, even if a UE does not experience interference from different modules included within the UE, the UE may experience interference based on signals received from neighbor cells, particularly if the communication system includes coexisting macro base stations and micro base stations (e.g., pico base stations, and/or femto base stations).

Figure 5:
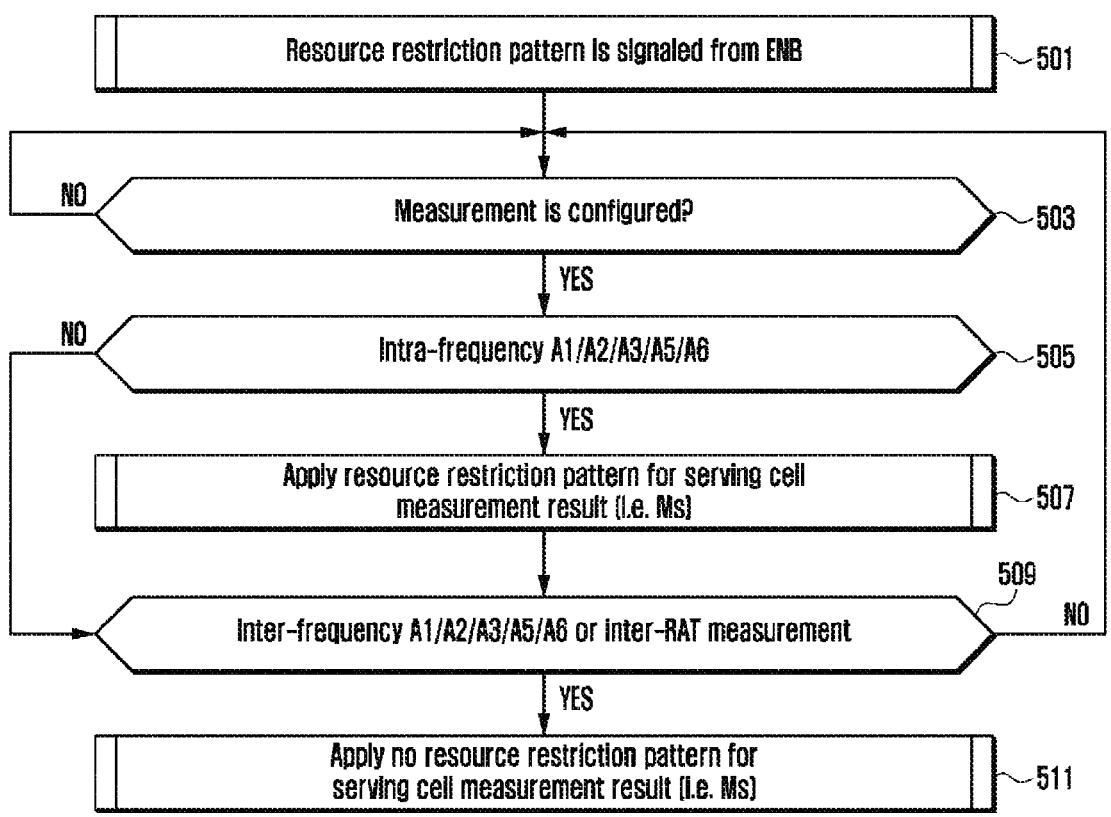
FIG. 5 is a flow diagram illustrating a method for measuring signal strength of a serving cell and neighbor cells in accordance with an exemplary embodiment of the present invention.

FIG. 5 is a flow diagram illustrating a method for measuring signal strength of a serving cell and neighbor cells in accordance with an exemplary embodiment of the present invention.

According to exemplary embodiments of the present invention, during the process of measuring serving cell signals, the first pattern information may be selectively applied, depending on whether signals of neighbor cells use the same frequency or a different frequency than a serving cell does. Specifically, the UE applies the first pattern information for serving cell measurement when the same frequency (i.e., intra-frequency) as that of a serving cell is measured. However, the UE does not apply the first pattern information for serving cell measurement when a different frequency (i.e., inter-frequency) from that of a serving cell is measured. The UE receives from the eNB the first pattern information of subframes which should not be measured in time during measurement of signals of a serving cell. The UE also receives from the eNB the second pattern information of subframes which should not be measured in time during measurement of signals of neighbor cells. Both the first pattern information and the second pattern information are applied in the same frequency as that of a serving cell. If the signal strength is measured in a different frequency, then application of the first pattern information to a serving cell may result in good measurement results because the measurement results may be obtained from signals of only less-interfered subframes. Additionally, by not applying the second pattern information to neighbor cells in different frequency, the measurement results may be poor because all subframes are measured without restriction. Such incorrect measurement results may lead to an unnecessary handover or ping-pong phenomenon (namely, a repeated handover between two eNBs). Therefore, in intra-frequency measurement the first pattern information is applied to serving cell measurement, and in inter-frequency measurement the first pattern information is not applied to serving cell measurement.

According to an exemplary embodiment of the present invention, the eNB signals a resource restriction pattern to the UE at step 501. The resource restriction pattern may be divided into a first pattern information and a second pattern information. The first pattern information is applied to serving cell measurement, and the second pattern information is applied to neighbor cell measurement. Such signaling of a resource restriction pattern may be made if the UE is handed over to a pico base station and is located at cell boundaries. In this case, if a resource restriction pattern is not configured in the UE, a communication between the UE and network may be disconnected due to severe interference from macro base stations. This disconnection caused by failed signals will be referred to as Radio Link Failure (RLF). After receiving a resource restriction pattern, the UE starts applying the resource restriction pattern so as to monitor radio link of a serving cell.

Then the UE determines whether the eNB configures measurement at step 503. The configured measurement includes a measurement object, reporting configurations, a measurement identity, a quantity of configurations, measurement gaps, and the like. A detailed description of each is provided below.

A Measurement object corresponds to an object to be measured by UE.

In a case of intra-frequency and inter-frequency, the measurement object may correspond to a single Evolved Universal Terrestrial Radio Access (E-UTRA) carrier frequency (offset, etc. of cells for each frequency may be specified).

In a case of inter system (inter-RAT) Universal Terrestrial Radio Access (UTRA) measurement, the measurement object may correspond to a set of cells in a single UTRA carrier frequency.

In a case of inter-RAT Global System For Mobile Communications (GSM) Enhanced Data rates for GSM Evolution (EDGE) Radio Access Network (GERAN) measurement, the measurement object may correspond to a set of cells in a single GERAN carrier frequency.

In a case of inter-RAT Code Division Multiple Access 2000 (CDMA2000) measurement, the measurement object may correspond to a set of cells in a single High Rate Packet Data (HRPD) or Single Carrier Radio Transmission Technology (1×RTT) carrier frequency.

Reporting configurations correspond to configurations for reporting conditions and formats.

A Measurement identity corresponds to an identity that is associated with a measurement object and that is used for a mapping of several measurement objects and a single reporting configuration or that is used for a mapping of a single measurement object and several reporting configurations.

Quantity configurations correspond to configurations that are configured for each RAT type and define a filtering value, etc. related to quantity.

Measurement gaps correspond to defined gaps to be used for measurement by UE such that there is no scheduling for uplink/downlink transmission in these gaps.

The measurement is configured in the UE for various purposes such as a support of UE mobility by the eNB or a load balancing of the eNB.

If measurement is configured, the UE determines whether the configured measurement is intra-frequency measurement or inter-frequency measurement at step 505. If the measurement object is for a serving frequency and the measurement configuration is Event A1, A2, A3, A5, or A6, the UE performs the next step. Events A1, A2, A3, A4, A5, and A6 correspond to the following.

Event A1: In a case in which a serving cell becomes better than a threshold.

Event A2: In a case in which a serving cell becomes worse than a threshold.

Event A3: In a case in which a neighbor cell becomes better by offset than a serving cell (or a Primary Cell (PCell)).

Event A4: In a case in which a neighbor cell becomes better than threshold.

Event A5: In a case in which a serving cell (or PCell) becomes worse than a first threshold and a neighbor cell becomes better than a second threshold.

Event A6: In a case where a neighbor cell becomes better by offset than a Secondary Cell (SCell) of a serving cell.

If a measuring frequency is the same (intra-frequency) as that of a serving cell and if a measurement configuration corresponds to Event A1, A2, A3, A5, or A6 (configuration for evaluating measurement results in consideration for serving cell measurement results), then the UE measures a serving cell by applying resource restriction pattern at step 507. Specifically, this means that the MS value defined in the LTE standard 36.331 is measured for subframes only displayed in resource restriction pattern. The MS is measurement result of a serving cell, the result including no offset. Until receiving additional instructions, the UE continuously measures a serving cell according to the resource restriction pattern.

If a measuring frequency is different (inter-frequency) from that of a serving cell, and if a measurement configuration corresponds to Event A1, A2, A3, A5, or A6 (configuration for evaluating measurement results in consideration for serving cell measurement results) or inter-RAT, then the UE checks Events B1 or B2 at step 509. Events B1 and B2 correspond to the following.

Event B1: In a case in which neighbor inter-RAT becomes better than a threshold.

Event B2: In a case in which a serving cell (or PCell) becomes worse than a first threshold and a neighbor inter-RAT becomes better than a second threshold.

If the above conditions are satisfied, then the UE performs step 511. Otherwise, the UE returns to the step 503.

At step 511, the UE measures a serving cell without applying the resource restriction pattern. Specifically, regardless of the MS value displayed in resource restriction pattern, all subframes are measured.

According to exemplary embodiments of the present invention, the UE measures a serving cell by applying the first pattern to measurement and also measures a serving cell without applying the first pattern to measurement. In evaluation for any measurement result, the UE uses a measurement result based on the first pattern if it is required to compare measurement result of a serving cell with that of a neighbor cell with a serving frequency, and uses measurement result not based on the first pattern if it is required to compare measurement result of a serving cell with that of a neighbor cell with other frequency.

Namely, the UE receives the first pattern information from the eNB, the pattern information being applied to serving cell measurement when given rules are satisfied. The followings are examples of given rules.

In comparison between measurement results of a serving cell and of a neighbor cell for any selected frequency, the serving cell measurement uses a measurement result based on the first pattern when the selected frequency satisfies one of the following conditions.

In a case of lively data transmission/reception at the selected frequency, namely in case of better data transmission rate and/or reception rate or communication rate (e.g., the amount of transmission/reception per unit time) than a predetermined rate: normally data transmission and reception are lively made in a serving cell. Because the UE configures or reconfigures the initial RRC connection in a serving cell, the following condition may be used.

In a case of configuration or reconfiguration of the initial RRC connection at the selected frequency: If the second pattern is applied to neighbor cell measurement, it means that interference from neighbor cells is excluded from neighbor cell measurement. Accordingly, it is desirable to apply the first pattern to serving cell measurement, and thus the following rule may be considered.

In a case of applying the second pattern to neighbor cell measurement at the selected frequency. In other words, the first pattern is not applied to serving cell measurement in the following cases.

In comparison between measurement results of a serving cell and of a neighbor cell for any selected frequency, the serving cell measurement uses a measurement result not based on the first pattern when the selected frequency satisfies one of the following conditions.

In a case in which the selected frequency is not a serving cell frequency (no overlap of frequency bands).

In a case in which the selected frequency is not a frequency at which the initial connection is configured or reconfigured.

In a case of not applying the second pattern to neighbor cell measurement at the selected frequency.

Both the first pattern information and the second pattern information are a bitmap having a certain length. For example, in a case of a Frequency Division Duplex (FDD) system, the length of the bitmap is 40 bits, and in a case of a Time Division Duplex (TDD) system, the length of the bitmap is 20 bits, 60 bits, or 70 bits. The first bit of the bitmap corresponds to the first subframe of a radio frame in which Single Frequency Network (SFN) mode x is zero in which x is obtained by dividing ten into the length of the bitmap. Bit zero means that a subframe concerned is not considered in measurement, and bit one means that a subframe concerned is considered in measurement. Because measurement is basically performed for forward subframes, the UE does not consider bit values for backward subframes in case of a TDD system. Namely, in case of a TDD system, the UE determines bits corresponding to forward subframes and then determines whether to consider the bits in measurement.

Figure 6:
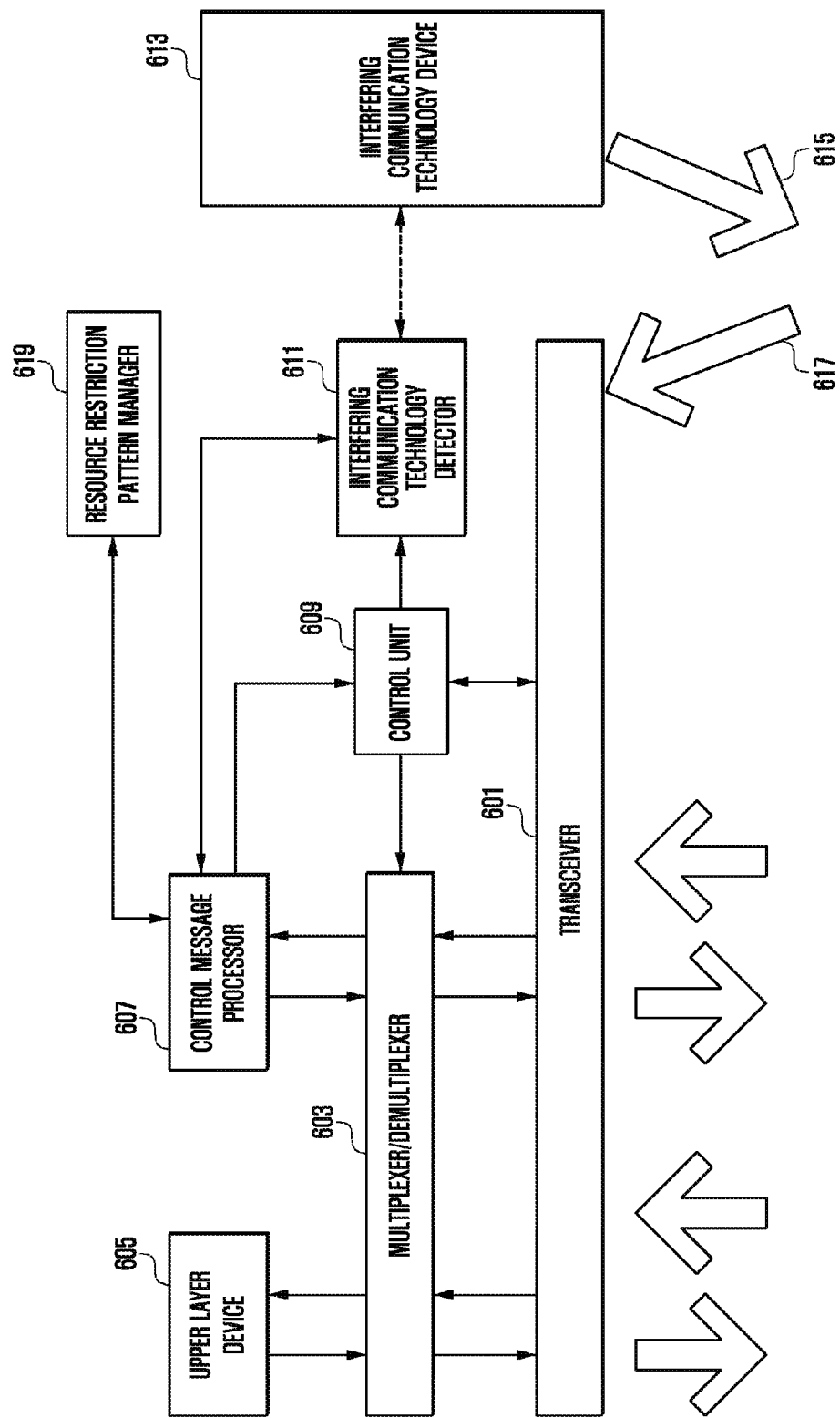
FIG. 6 is a block diagram illustrating a device in accordance with an exemplary embodiment of the present invention.

FIG. 6 is a block diagram illustrating a device in accordance with an exemplary embodiment of the present invention.

Referring to FIG. 6, according to an exemplary embodiment of the present invention, a UE may include a transceiver 601, a multiplexer/demultiplexer (mux/demux) 603, an upper layer unit 605, a control message processor 607, a control unit 609, an interfering communication technology detector 611, and a resource restriction pattern manager 619. The UE may also include an interfering communication technology device 613.

The UE sends and receives data to and from an upper layer device 605, and also sends/receives control messages through a control message processor 607. In an operation corresponding to transmission of data, the device multiplexes data through a multiplexer/demultiplexer 603, and then sends the data through a transceiver 601 under the control of a control unit 609 so as to transmit the multiplexed data. In an operation corresponding to reception of data, the device receives signals through the transceiver 601, demultiplexes the received signals through the multiplexer/demultiplexer 603, and then sends the signals to the upper layer device 605 or to the control message processor 607 according to each message information under the control of the control unit 609.

When an interfering communication technology device 613 directly notifies an interfering communication technology detector 611 that the power is turned on or that an operation is started, when the interfering communication technology detector 611 has already known the existence of interfering communication technology, or when the control unit 609 notifies the interfering communication technology detector 611 that outgoing signals 615 transmitted from the interfering communication technology device 613 flow into the transceiver 601 as strong interference signals 617, the device examines a BLER, a PDCCH error rate, an RSRP, or an RSRQ of incoming signals. If the BLER or the like becomes worse than the above-discussed threshold, the device measures signals for interfered subframes only, and sends a measurement report.

Additionally, when receiving information about a resource restriction pattern from a resource restriction pattern manager 619 through the control message processor 607 under circumstances in which macro base stations and pico/femto base stations coexist, the device performs measurement for subframes according to the resource restriction pattern in case in which measurement is configured for intra-frequency and also in case of Event A1, A2, A3, A5 or A6. Alternatively, in a case in which measurement is configured for inter-frequency and also in case of event A1, A2, A3, A5 or A6 (or in case of B1 or B2 in inter-RAT), the device performs measurement for subframes to which information about the resource restriction pattern is not applied.

Exemplary embodiments of the present invention provide a method that may allow more effective measurement in current or potential interference circumstances. Because a report of such measurement is provided to base stations to perform a handover, it may be possible to avoid interference with interfering communication technologies, and to realize a smooth communication.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for comparing measurement results of a serving cell and a neighbor cell, the method comprising:
   receiving, by a user equipment (UE), a resource restriction pattern including first pattern information that indicates specific subframes to be restricted in measurement of the serving cell;
   measuring, by the UE, the neighbor cell at a first frequency band;
   measuring, by the UE, if a predetermined condition is met, the serving cell applying the first pattern information, and measuring, if the predetermined condition is not met, the serving cell without applying the first pattern information; and
   performing, by the UE, evaluation by comparing a serving cell measurement result obtained from measurement of the serving cell with a neighbor cell measurement result obtained from measurement of the neighbor cell.

2. The method of claim 1, wherein the measuring of the serving cell includes:
   measuring, if a frequency band of the serving cell overlaps at least in part with the first frequency band, the serving cell applying the first pattern information, and measuring, if the frequency band of the serving cell does not overlap with the first frequency band, the serving cell without applying the first pattern information.

3. The method of claim 1, wherein the measuring of the serving cell includes:
   measuring, if a data transmission/reception rate is equal to or greater than a predetermined value in the first frequency band, the serving cell applying the first pattern information, and measuring, if the data transmission/reception rate is lower than the predetermined value, the serving cell without applying the first pattern information.

4. The method of claim 1, wherein the measuring of the serving cell includes:
   measuring, if a frequency band of a last Radio Resource Control (RRC) configuration or reconfiguration corresponds to the first frequency band, the serving cell applying the first pattern information, and measuring, if the frequency band of the last RRC configuration or reconfiguration does not correspond to the first frequency band, the serving cell without applying the first pattern information.

5. The method of claim 1, wherein the resource restriction pattern further includes second pattern information that indicates specific subframes to be restricted in measurement of the neighbor cell, and
   wherein the measuring of the serving cell comprises:
   measuring, if the second pattern information is applied to the neighbor cell measurement in the first frequency band, the serving cell applying the first pattern information, and measuring, if the second pattern information is not applied to the neighbor cell measurement in the first frequency band, the serving cell without applying the first pattern information.

6. The method of claim 1, wherein the measuring of the serving cell includes:
   measuring, if measurement of the neighbor cell is an intra-frequency cell measurement, the serving cell applying the first pattern information, and measuring, if the neighbor cell measurement is an inter-frequency cell measurement, the serving cell without applying the first pattern information.

7. The method of claim 1, wherein the measuring of the serving cell includes:
   measuring, if a frequency band of the serving cell is identical to the first frequency band, the serving cell applying the first pattern information, and measuring, if the frequency band of the serving cell is not identical to the first frequency band, the serving cell without applying the first pattern information.

8. A device for comparing measurement results of a serving cell and a neighbor cell, the device comprising:
   a transceiver configured to receive a resource restriction pattern including first pattern information that indicates specific subframes to be restricted in measurement of the serving cell; and
   a control unit configured to measure the neighbor cell at a first frequency band, to measure, if a predetermined condition is met, the serving cell applying the first pattern information, to measure, if the predetermined condition is not met, the serving cell without applying the first pattern information, and to perform evaluation by comparing a serving cell measurement result obtained from measurement of the serving cell with a neighbor cell measurement result obtained from measurement of the neighbor cell.

9. The device of claim 8, wherein the control unit is further configured to measure, if a frequency band of the serving cell overlaps at least in part with the first frequency band, the serving cell applying the first pattern information, and to measure, if the frequency band of the serving cell does not overlap with the first frequency band, the serving cell without applying the first pattern information.

10. The device of claim 8, wherein the control unit is further configured to measure, if a data transmission/reception rate is equal to or greater than a predetermined value in the first frequency band, the serving cell applying the first pattern information, and to measure, if the data transmission/reception rate is lower than the predetermined value, the serving cell without applying the first pattern information.

11. The device of claim 8, wherein the control unit is further configured to measure, if a frequency band of a last Radio Resource Control (RRC) configuration or reconfiguration corresponds to the first frequency band, the serving cell applying the first pattern information, and to measure, if the frequency band of the last RRC configuration or reconfiguration does not correspond to the first frequency band, the serving cell without applying the first pattern information.

12. The device of claim 8, wherein the resource restriction pattern further includes second pattern information that indicates specific subframes to be restricted in measurement of the neighbor cell, and wherein the control unit is further configured to measure, if the second pattern information is applied to the neighbor cell measurement in the first frequency band, the serving cell applying the first pattern information, and to measure, if the second pattern information is not applied to the neighbor cell measurement in the first frequency band, the serving cell without applying the first pattern information.

13. The device of claim 8, wherein the control unit is further configured to measure, if measurement of the neighbor cell is an intra-frequency cell measurement, the serving cell applying the first pattern information, and to measure, if the neighbor cell measurement is an inter-frequency cell measurement, the serving cell without applying the first pattern information.

14. The device of claim 8, wherein the control unit is further configured to measure, if a frequency band of the serving cell is identical to the first frequency band, the serving cell applying the first pattern information, and to measure, if the frequency band of the serving cell is not identical to the first frequency band, the serving cell without applying the first pattern information.

* * * * *